United States Patent [19]
Mullaly et al.

[11] Patent Number: 6,069,632
[45] Date of Patent: May 30, 2000

[54] PASSAGEWAY PROPERTIES: CUSTOMIZABLE PROTOCOLS FOR ENTRY AND EXIT OF PLACES

[75] Inventors: John Martin Mullaly, Austin; Richard Edmond Berry; Scott Harlan Isensee, both of Georgetown, all of Tex.; David John Roberts, Stockton, United Kingdom

[73] Assignee: International Business Machines Corporation, Armonk, N.Y.

[21] Appl. No.: 08/887,829

[22] Filed: Jul. 3, 1997

[51] Int. Cl.[7] .................................................... G06T 15/00
[52] U.S. Cl. .......................................... 345/419; 345/427
[58] Field of Search ................................. 345/418, 419, 345/420, 423, 424, 425, 427

[56] References Cited

U.S. PATENT DOCUMENTS

| | | | |
|---|---|---|---|
| 5,310,349 | 5/1994 | Daniels et al. .......................... 434/350 |
| 5,369,735 | 11/1994 | Thier et al. .............................. 395/123 |
| 5,410,644 | 4/1995 | Thier et al. .............................. 395/125 |
| 5,555,354 | 9/1996 | Strasnick et al. ....................... 345/427 |
| 5,559,995 | 9/1996 | Browning et al. ............... 395/500.027 |

*Primary Examiner*—Phu K. Nguyen
*Assistant Examiner*—Cliff N. Vo
*Attorney, Agent, or Firm*—Paul Kraft; Volel Emile; Mark E. McBurney

[57] ABSTRACT

The instant invention relates to a system and method of assisting interactive users to effectively address the need to control the user's entrance and exit of places in virtual 3-D workspace. Specifically, how can a designer and or a user best control what happens when the user enters or exits a particular place in a virtual reality environment. The purpose of this invention, "Passageway Properties", is the creation of customizable attributes pertaining to the behavior of the user interface upon the entrance or exit of places in virtual environments.

21 Claims, 7 Drawing Sheets

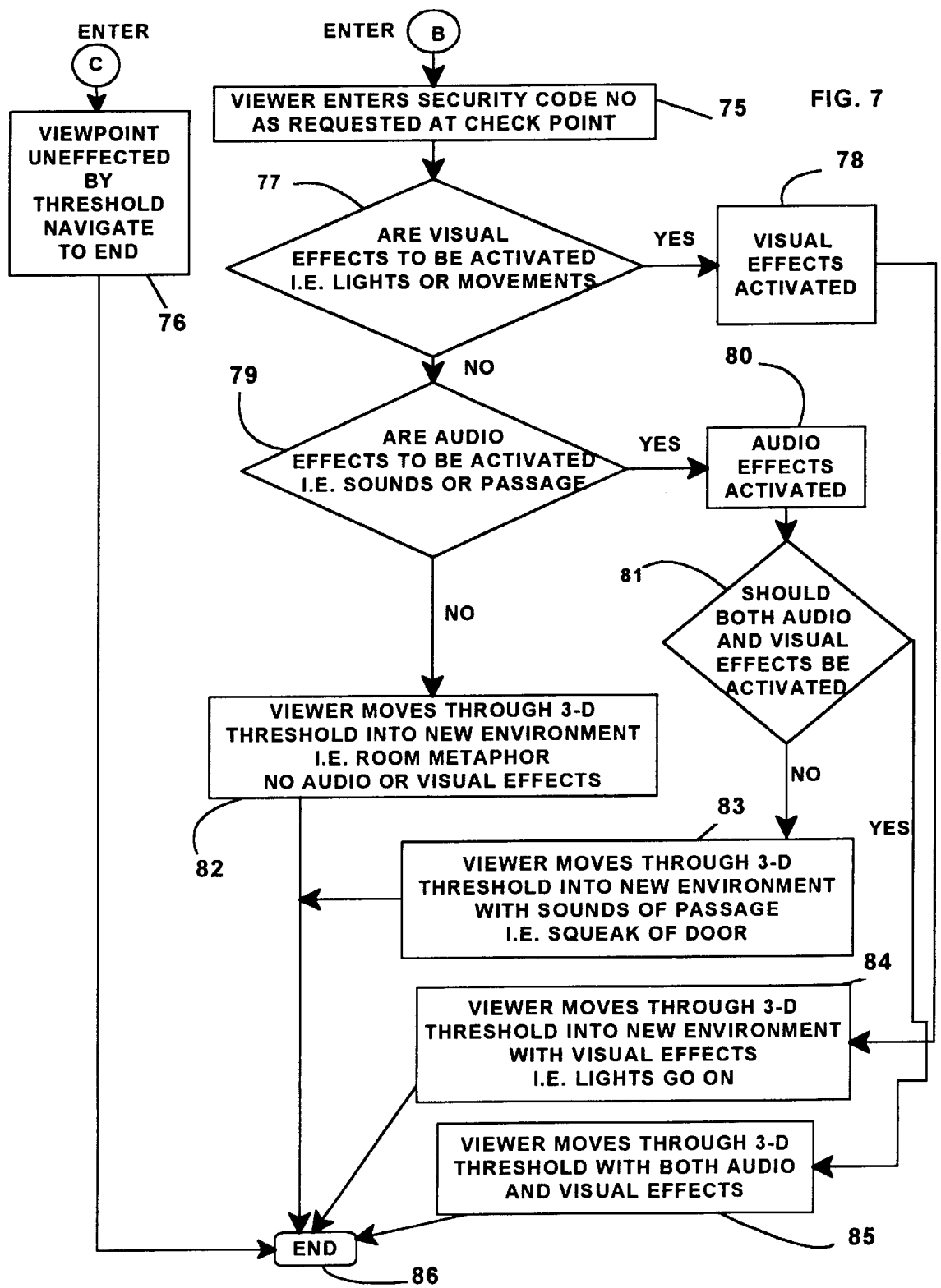

PASSAGEWAY PROPERTIES: CUSTOMIZABLE PROTOCOLS FOR ENTRY AND EXIT OF PLACES

TECHNICAL FIELD

The present invention relates to user interactive computer supported display technology and particularly to such user interactive systems and methods which are user friendly, i.e. provide even noncomputer literate users with an interface environment which is easy to use and intuitive.

BACKGROUND OF THE INVENTION AND PRIOR ART

The 1990's decade has been marked by a societal technological revolution driven by the convergence of the data processing industry with the consumer electronics industry. This advance has been even further accelerated by the extensive consumer and business involvement in the internet over the past two years. As a result of these changes, it seems as if virtually all aspects of human endeavor in the industrialized world requires human-computer interfaces. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers to be involved in computer interfaces. Thus, the challenge of our technology is to create interfaces to computers which are as close to the real world as possible.

Industry has been working towards this challenge and there is presently a relatively high degree of realism possible in interfaces. This presents a need and an opportunity for even more realistic interaction techniques to better match the visual metaphors used and to achieve a higher level of ease of use for computer systems. We are striving towards the representation of object as photo realistic, three-dimensional (3D) models rather than as the icons and two-dimensional desktops of conventional computer technology.

Some examples of current technology for the creation of virtual three-dimensional workspace display interfaces are copending application Ser. No. 08/753,081, entitled "CREATING REAL WORLD OBJECTS" and Ser. No. 08/753,076, entitled "SYSTEM AND METHOD FOR MAINTAINING SIZE AND POSITION RELATIONSHIPS FOR NONRECTANGULAR REAL WORLD OBJECTS", assigned to the Assignee of the present application.

A 3D virtual workspace display environment is also described in an article entitled, "RAPID CONTROLLED MOVEMENT THROUGH A VIRTUAL 3D WORKSPACE", Jock Mackinlay et al., *Computer Graphics Publication*, Vol. 24, No. 4, August 1990, pp. 171–175, as well as in its related U.S. Pat. No. 5,276,785.

A more recent copending application assigned to the Assignee of the present invention is entitled, "VIEWER INTERACTIVE OBJECT IN VIRTUAL THREE-DIMENSIONAL WORKSPACE", D. Bardon et al. (Attorney Docket No. AT9-96-310), which covers face views of virtual three-dimensional objects which may be triggered to appear on a display by interactive viewer input.

It is clear that current technology in virtual three-dimensional workspaces has provided environments which are user friendly, i.e. make the casual computer user feel more comfortable and at home with the interface. However, researchers in human factors have found downsides to three-dimensional virtual reality displays. Because of the many choices that the user has in wandering down various "streets and roads" or visiting a wide variety of "buildings or stores" or going through many possible "doors", the user may wander through this reality and perhaps get lost from the track or goal he is pursuing.

The present invention addresses this problem, i.e. that of helping the interactive user in three-dimensional graphic environments to stay focused and relate to the objects he is seeking to relate to in the manner he is seeking to relate to such objects even when these objects are arranged in 3D space in what appears to be infinite configurations.

In these virtual reality 3D environments as in the real world, the viewer or user is relating to the virtual objects in order to carry out a wide variety of tasks, some of which are quite simple and some very complex. In order for the user to stay focused and carry out his tasks as expeditiously as possible, it would be optimum for the virtual 3D system to provide simpler user interfaces for simple tasks and more comprehensive user interfaces for more complex tasks.

Thus, when the viewer's task is a simple one such as getting more information about a current movie film or about a newly released music CD, the user may be presented with his information in an interface as simple as a face view of a virtual 3D object which contains the information. For example, in the virtual 3D world or workspace, the viewer may navigate to a virtual three-dimensional object of a theater and get his desired movie film information from a face view of the object which presents a marquee of the theater. Similarly, the viewer seeking CD information might navigate to and be presented with a face view of a virtual CD vending kiosk which presents him with his desired information. The above-mentioned patent application, "VIEWER INTERACTIVE OBJECT IN VIRTUAL THREE-DIMENSIONAL WORKSPACE", D. B. Bardon et al., describes such face views of 3D virtual objects. With such simple tasks, the viewer notes his desired information, perhaps makes some simple choices and moves on with his navigation through the virtual 3D workspace.

On the other hand, the navigating viewer's task may be a more complex one like tracking and updating product sales information of a business or group of businesses or within a report or filing a tax statement.

SUMMARY OF THE INVENTION

Before setting forth the present invention, we should establish some basic characteristics of the virtual three-dimensional environment as described in the above-referenced patents and applications. It is understood that in order to navigate through three-dimensional space, view the space or relate to objects within the space, a viewpoint is determined within that space. That viewpoint is the virtual position of the viewer or person who is navigating within the three-dimensional space. The viewpoint is commonly defined by its position and its orientation or direction. For purposes of describing this invention, we will use the metaphor of a camera to understand the viewpoint. The camera's position and orientation are where it is and which way it is pointing. Let us refer to another property of a viewpoint which is "field of view"; this is effectively the resulting view from a given viewpoint. A key need of a viewer navigating through virtual three-dimensional space is to stay focused.

As set forth above, it is easier to stay focused when the task for which he is accessing the object is a simple one. The present invention deals with helping viewers to stay focused in more complex tasks.

The present invention operates within the previously described data processor controlled display system for displaying a virtual three-dimensional object having three-dimensional objects which are interactively functional, i.e. may be picked by the viewer or user for various computer interactive functions.

The present invention has associated with and stored for each of a plurality of such functional virtual objects, at least one planar two-dimensional image of the virtual object, i.e. the two-dimensional image has sufficient visual similarity to the object which it represents that the viewer or user will intuitively connect the two as he addresses the three-dimensional workspace. The system provides user interactive means so that the user can select one of the virtual objects and means responsive to such a user selection for displaying the two-dimensional planar image associated with the selected object.

The system further provides user interactive means to this planar two-dimensional image so that the user may carry out conventional computer functions such as spreadsheets or word processing within this two-dimensional image. In accordance with an aspect of the present invention, this planar two-dimensional image may be user interactive interfaced to a variety of standard computer applications such as word processing, spreadsheets or CAD/CAM.

In accordance with a more particular aspect of the present invention, because of the object oriented programming environment which is used to implement the present invention, the virtual three-dimensional object is stored in the computer and treated as an entity whereby the three-dimensional object may be changed in size, position and appearance.

In the manner described above, once interactive planar two-dimensional image is opened, the user may retain it as an active access to the computer function being carried out interactively within the image, e.g. an application program even when the user is also navigating through the virtual three-dimensional workspace and is proceeding to or relating to a subsequent three-dimensional object other than the three-dimensional object associated with the selected two-dimensional image.

In order to understand the present invention, it is important its advantages over conventional two-dimensional systems be considered. In such two-dimensional systems, the potential functions and applications of the display systems are represented by an array of icons which the user may respectively select in order to bring forth particular computer functional application interface on the display. Other than representing a particular computer function or program, these conventional two-dimensional icons of the prior art do not act in combination with other elements as do the three-dimensional object of the present invention to provide interrelated three-dimensional environment through which the viewer may navigate. Such a three-dimensional virtual workspace environment permits even the most complex of computer setups to be intuitively organized with respect to the viewer so that the viewer may navigate and make appropriate selections and combinations of selections.

In accordance with a more particular aspect of the present invention, because of the object oriented programming environment which is used to implement the present invention, the virtual three-dimensional object and its associated planar two-dimensional functional image are stored in the computer and treated as an entity whereby the three-dimensional object may be changed in size, position and appearance without affecting its relationship with the interactive two-dimensional image which it represents.

The major embodiment of the instant invention relates to a system and method of assisting interactive users to effectively address the need to facilitate control over the user's entrance and exit of places in virtual 3-D workspace. Specifically, how can a designer and or a user best control what happens when the user enters or exits a particular place in a virtual reality environment.

Regarding the instant invention, it should be understood that in graphical virtual environments, multiple spaces (or places) may be put together to form a composite space. For example, spaces assigned with a "room" metaphor may be put together within a building metaphor, or spaces designed with a building metaphor may be put together within a neighborhood or city metaphor. Movement within and between such spaces is an aspect of human-computer interaction which presents many problems and challenges to the useability of software with 3D or virtual environment interfaces.

Therefore the specific purpose of the instant invention-"Passageway Properties", is the creation of customizable attributes pertaining to the behavior of the user interface upon the entrance or exit of places in virtual environments. A passageway is a way in which users enter or exit places in virtual environments. Passageways would typically be designed with a door metaphor, but may be any representation of the "threshold" between one place and another in a virtual environment. The crossing of such a threshold may involve such things as security checks, visual effects, audio effects, etc. The behavior and effects of the user interface, when users enter or exit a place in a virtual environment, will be referred to collectively as the "passageway protocol" for that place.

This invention further presents the "passageway protocol" as properties of the object which is the passageway. Such properties may then be easily specified by designers and/or users of virtual places. Passageways, such as doors may be given properties pertaining to security (e.g., list of authorized users, password checks etc.), audio effects, visual effects (e.g. fade, cut, wipe, etc.) or other effects

BRIEF DESCRIPTION OF THE DRAWINGS

FIGS. 6 and 7 are flowcharts of a process implemented by the present invention for creating moving the viewer or user through a 3-D virtual reality passageway and passing through a threshold into another environmental metaphor (i.e. hallway into a secure storage room)

DETAILED DESCRIPTION OF THE PREFERRED EMBODIMENT

Figure 1:
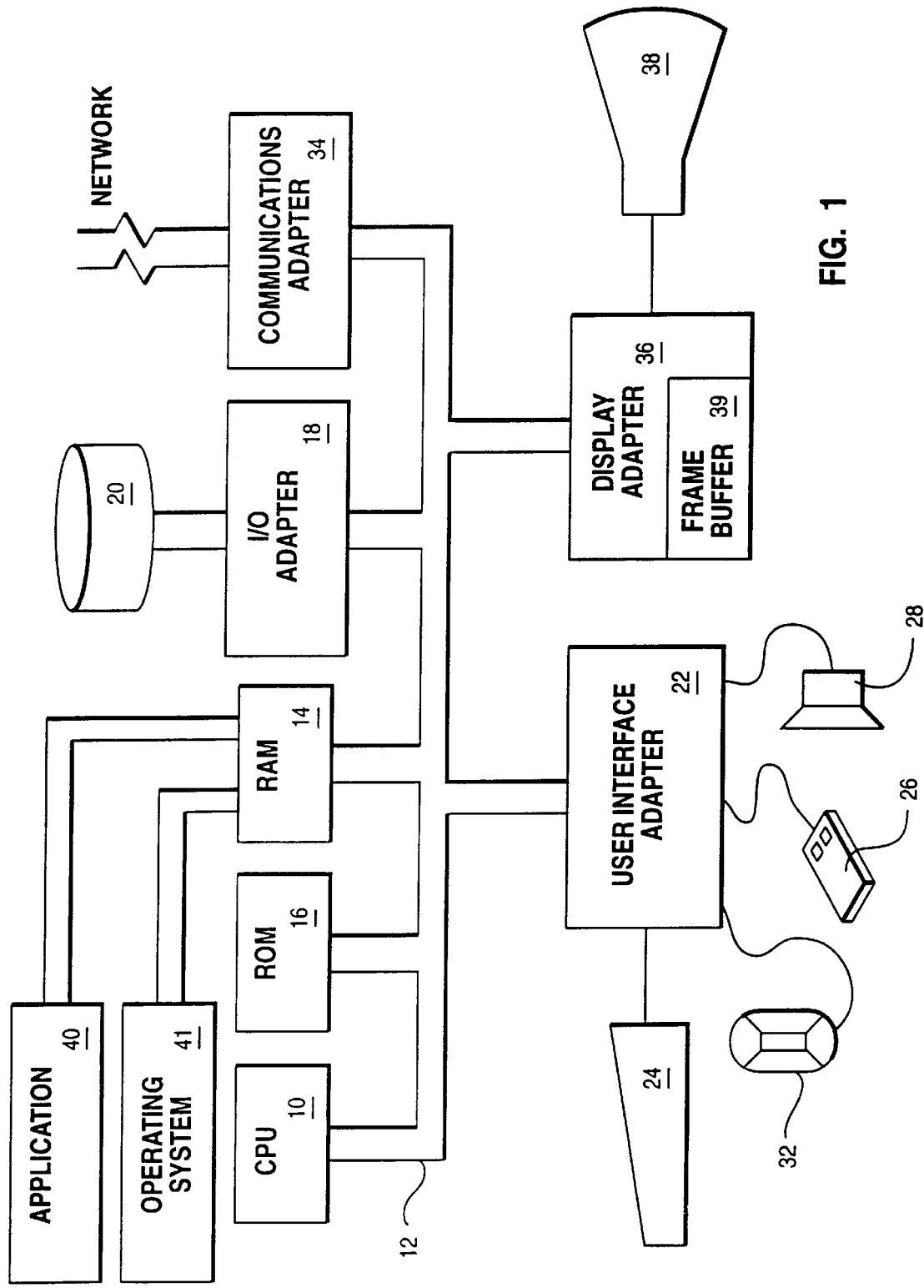
FIG. 1 is a block diagram of a data processing system including a central processing unit which is capable of implementing the present invention.

Before going into the details of specific embodiments, it will be helpful to understand from a more general perspective the various elements and method which may be used to implement the present invention. The present invention is implemented in three-dimensional virtual workspace. A three-dimensional workspace is a workspace that is perceived as extending in three orthogonal directions. Typically a display has a two-dimensional display surface and the perception of a third dimension is effected by visual clues such as perspective lines extending toward a vanishing point. Distant objects are obscured by nearer objects. The three-dimensional effect is also provided by showing changes in objects as they move toward or away from the viewer. Perspective shading of objects and a variety of shadowing of objects at different distances from the viewer also contribute to the three-dimensional effect.

A three-dimensional workspace is typically perceived as being viewed from a position within the workspace. This position is a viewpoint. This viewpoint provides the virtual interface between the display user and the display. The viewpoint's direction of orientation is the direction from the viewpoint into the field of view along the axis at the center of the field of view.

In order to present a three-dimensional workspace, a system may store data indicating "coordinates" of the position of an object, a viewpoint or other display feature in the workspace. Data indicating coordinates of a display feature can then be used in presenting the display feature so that it is perceptible as positioned at the indicated coordinates. The "distance" between two display features is the perceptible distance between them, and can be determined from their coordinates if they are presented so that they appear to be positioned at their coordinates.

Techniques for providing and handling three-dimensional objects in a three-dimensional virtual workspace have been developed in the art and are available to display user interface designers. U.S. Pat. No. 5,276,785 (Mackinlay et al., Jan. 4, 1994) is an example of the design techniques available to such three-dimensional workspace interface designers.

The description of the present invention often refers to navigation within the three-dimensional virtual workspace. The workspace or landscape is navigable using conventional three-dimensional navigation techniques. A user may move around or navigate within the three-dimensional data representation to alter his perspective and view of the displayed representation of the data. Thus, a user may be referred to as a navigator. The navigator is actually stationary, and his view of the display space changes to give him the sensation of moving within the three-dimensional graphical space. Thus, we speak in terms of the navigator's perceived motion when we refer to changes in his view of the display space. As the user moves, his view of the data changes accordingly within the three-dimensional data representation. Some navigation modes include browsing, searching and data movement. U.S. Pat. No. 5,555,354 (Strasnick et al., Sep. 10, 1996) describes some known navigation techniques.

The three-dimensional objects which will be subsequently described in embodiments of the present invention may be best implemented using object oriented programming techniques, such as the object oriented techniques described in the above-mentioned copending application No. 08/753,076 assigned to the Assignee of the present invention. The objects of that copending application are implemented using the C++ programming language. C++ is a compiled language.

The programs are written in human readable script and this script is provided to another program called a compiler to generate a machine readable numeric code which can be loaded into, and directly executed by the computer. The C++ language possesses certain characteristics which allow a software developer to easily use programs written by others while still providing a great deal of control over the reuse of programs to prevent their destruction or improper use. The C++ language is well known and many articles and text are available which describe the language in detail.

While the embodiment of the present invention, which will be subsequently described, can be implemented using object oriented techniques involving the C++ programming language, we found it effective to use SCL as used in VRT: the Virtual Reality Toolkit developed and marketed by Superscape Ltd. having U.S. offices in Palo Alto, Calif. Extensive details of these programming techniques may be found in the Superscape VRT, Reference Manual, Version 4-00, 2d Edition, Jan. 29, 1996.

It should be understood by those skilled in the art that object oriented programming techniques involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related method are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and presents the program from being run.

Polymorphism allows objects and functions which have the same overall format, but which work with different data, to function differently to produce consistent results. For example, an addition method may be defined as variable A+variable B, (A+B). The same format can be used whether the A and B are numbers, characters or dollars and cents. However, the actual program code which performs the addition may differ widely depending on the type of variables which comprise A and B. Thus, each type of variable (numbers, characters and dollars). After the methods have been defined, a program can later refer to the addition method by its common format (A+B) and, during compilation, the compiler will determine which of the three methods to be used by examining the variable types. The compiler will then substitute the proper function code.

A third property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such predefined classes and libraries are typically called "frameworks" and essentially provide a prefabricated structure as a basis for creating a working application program.

In object oriented programming such as the previously described VRT software platform, there is provided for the user interface a framework containing a set of predefined interface objects. The framework contains predefined classes which can be used as base classes and a developer may accept and incorporate some of the objects into these base classes, or he may modify or override objects or combinations of objects in these base classes to extend the framework and create customized solutions in particular areas of expertise.

This object oriented approach provides a major advantage over traditional programming since the programmer is not changing the original program, but rather extending the capabilities of the original program.

The above-described Superscape Virtual Reality Toolkit (VRT) provides the architectural guidance and modeling, but at the same time frees developers to supply specific actions unique to the particular problem domain which the developer is addressing.

In accordance with a more particular aspect of the present invention, because of the object oriented programming environment which is used to implement the present invention, the virtual three-dimensional object is stored in the computer and treated as an entity whereby the three-dimensional object may be changed in size, position and appearance.

Therefore, those skilled in the art will understand how the present invention is implemented using object oriented programming techniques as described above.

Referring to FIG. 1, a typical data processing system is shown, which may be used in conjunction with object oriented software in implementing the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A program application such as the program in the above-mentioned VRT platform 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described a simple illustration of the present invention. When the images are described, it will be understood that these may be rendered by storing a virtual reality three-dimensional image creation application program 40 such as the previously described VRT of Superscape in the RAM 14 of the system of FIG. 1. Also stored on the RAM will be a suitable operating system 41 such as DOS or Windows.

Figure 2:
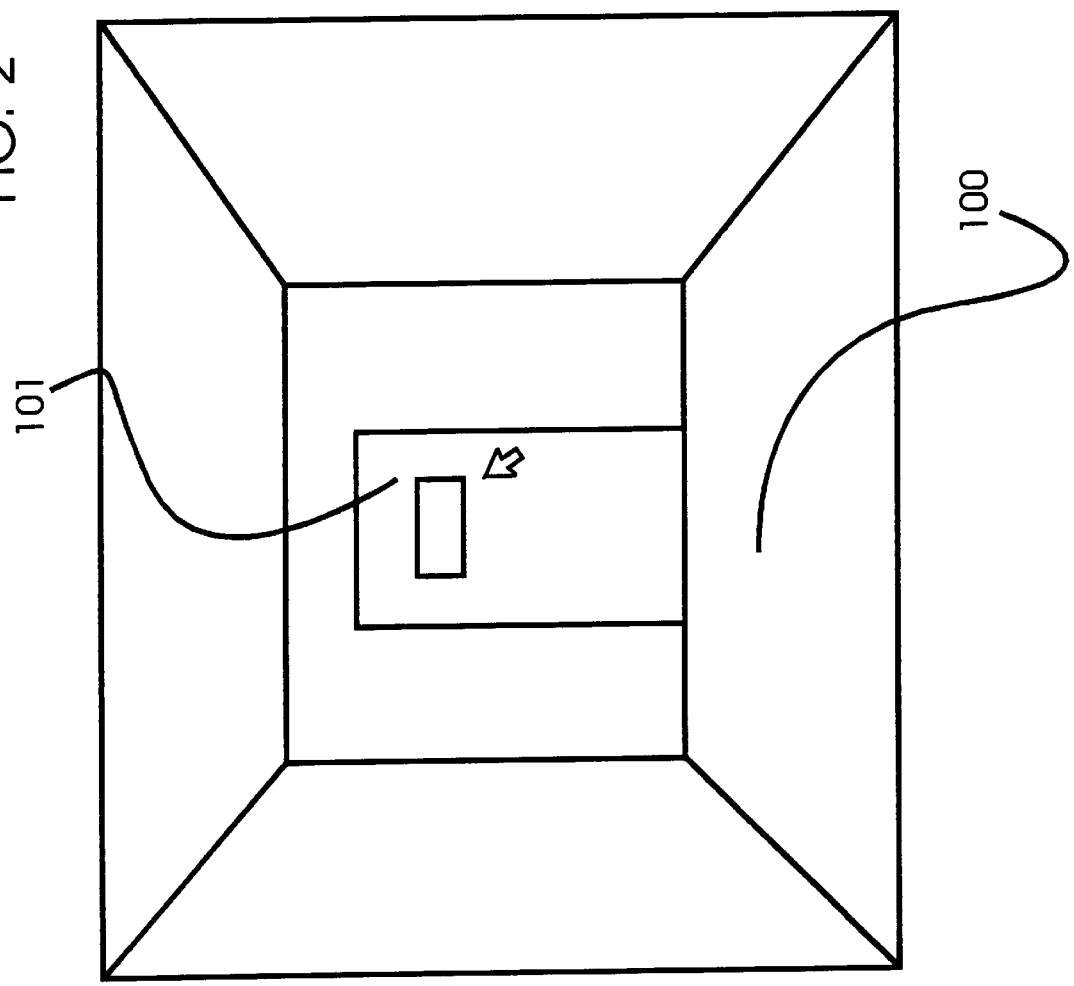
FIG. 2 shows a typical virtual reality workplace passageway as the viewer navigates along it by merely clicking on it. Viewer wishes to enter the storage room via the storage door at the end of the passageway.

An embodiment of the present invention with respect to the virtual reality workspace is shown in FIG. 2. The passageway workspace FIG. 2 100 is centered within a viewpoint interface which is presented to the viewer on display monitor 38 of FIG. 1. In accordance with conventional techniques, the user may control the viewpoint 45 through a conventional I/O device such as mouse 26 or FIG. 1 which operates through the user interface 22 of FIG. 1 to call upon VRT programs in RAM 14 operating with the operating system 41 to create the images in frame buffer 39 of display adapter 36 to control the display on monitor 38. Using conventional virtual three-dimensional workspace navigation techniques, the viewpoint interface 45 of FIG. 2 is changeable as the viewer moves closer or backs away from objects in the workspace or moves to right or to the left in the workspace. All this may be controlled by a suitable I/O device such as mouse 26 of FIG. 1.

The previously mentioned, devices within workspace such as 100 are functional three-dimensional objects such as the threshold door to storage. Images for various objects are stored as data from which the objects may be created on the display in RAM 14 of FIG. 1 in connection with the VRT program.

Figure 3:
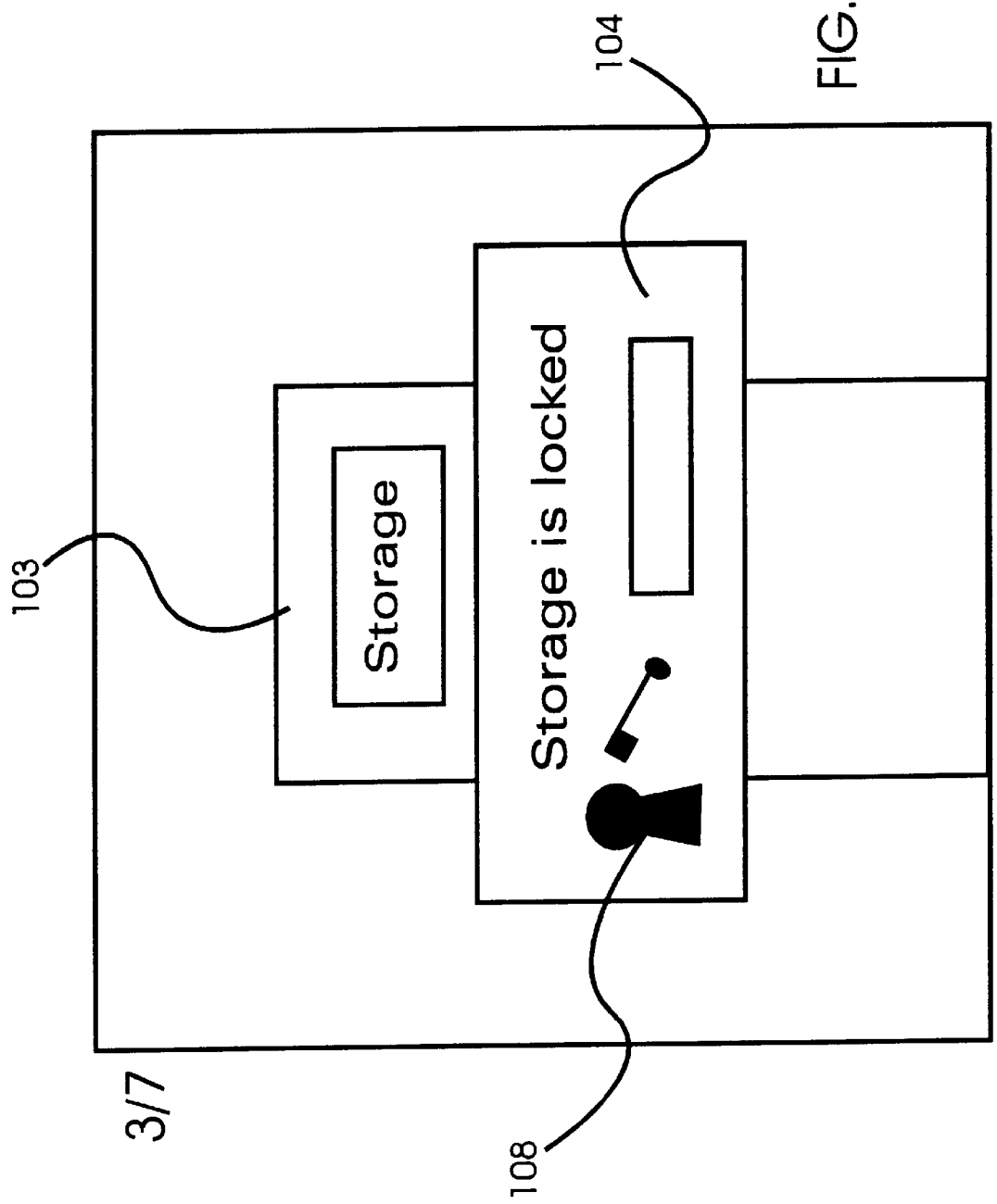
FIG. 3 is a representation of viewer reaching the storage door, which now exercises a request for a password in order to have the door open. Thus this represents the means of facilitate control over the viewer's entrance. Thus the system can control what happens when viewer or user enters a place (i.e. storage room) in virtual reality.

In the workspace in FIG. 2 shown as a hallway or passageway 100 in a 3-D workspace environment, we assume that the viewer or user wishes to navigate to a storage door 101 by clicking on it. He or she wishes to gain access to the storage room metaphor on the other side of this threshold 101. The viewer, FIG. 3, can not move into the storage room metaphor without supplying a password 104, which acts as a symbolic key 108 to open the door 103.

Figure 4:
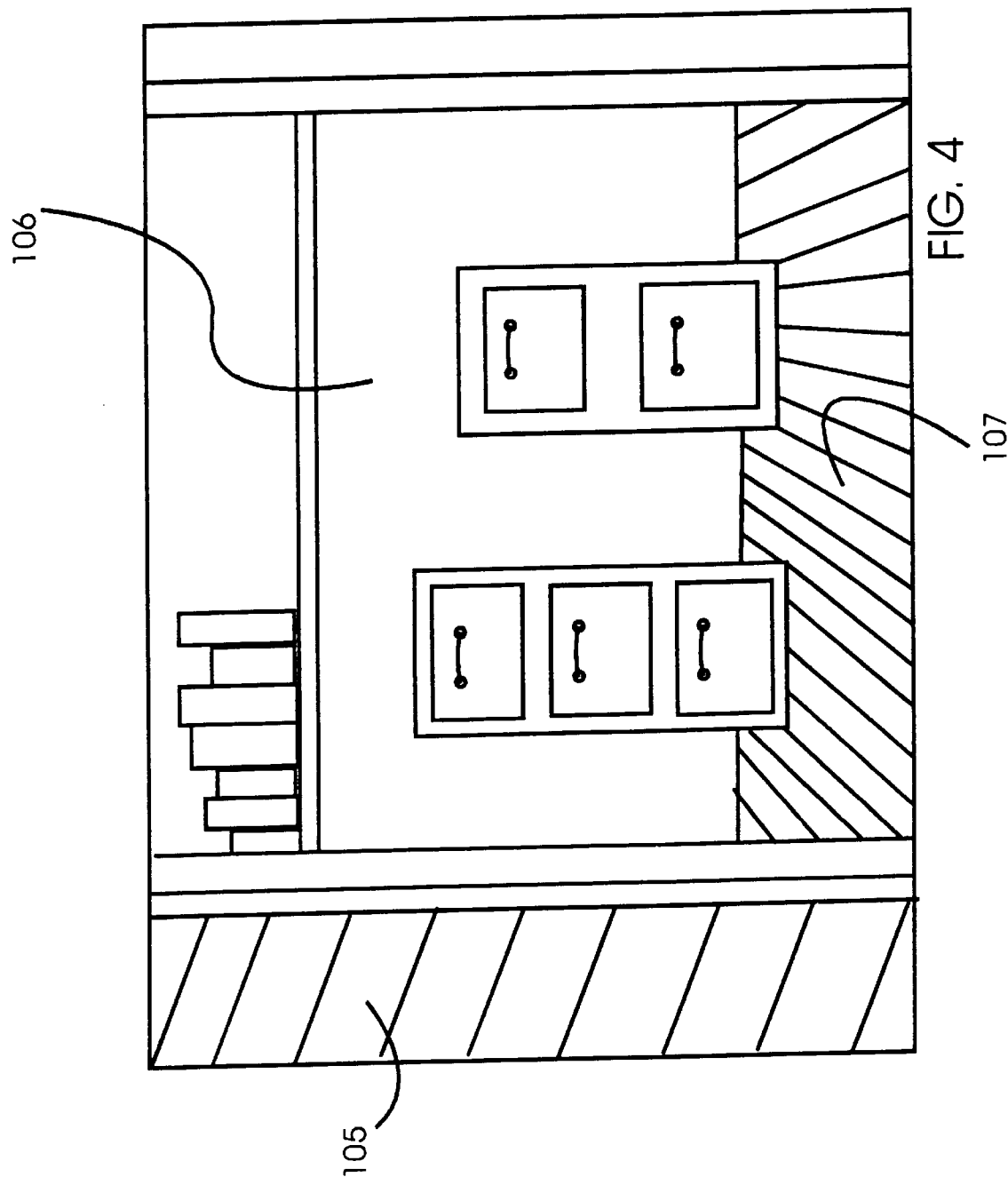
FIG. 4 is a representation what behavioral effect occur when the proper password is supplied, the door has the visual effect of opening and the viewer or user being moved through the doorway. There is also a sound effect of the key being turned and the lock springing open.

Once the security check is confirmed by the correct password, FIG. 4, the threshold is passed as the door 105 opens and the viewer is allowed to gain access by passing through the threshold 107 and enter the 3-D virtual reality workspace of the storage room 106.

Figure 5:
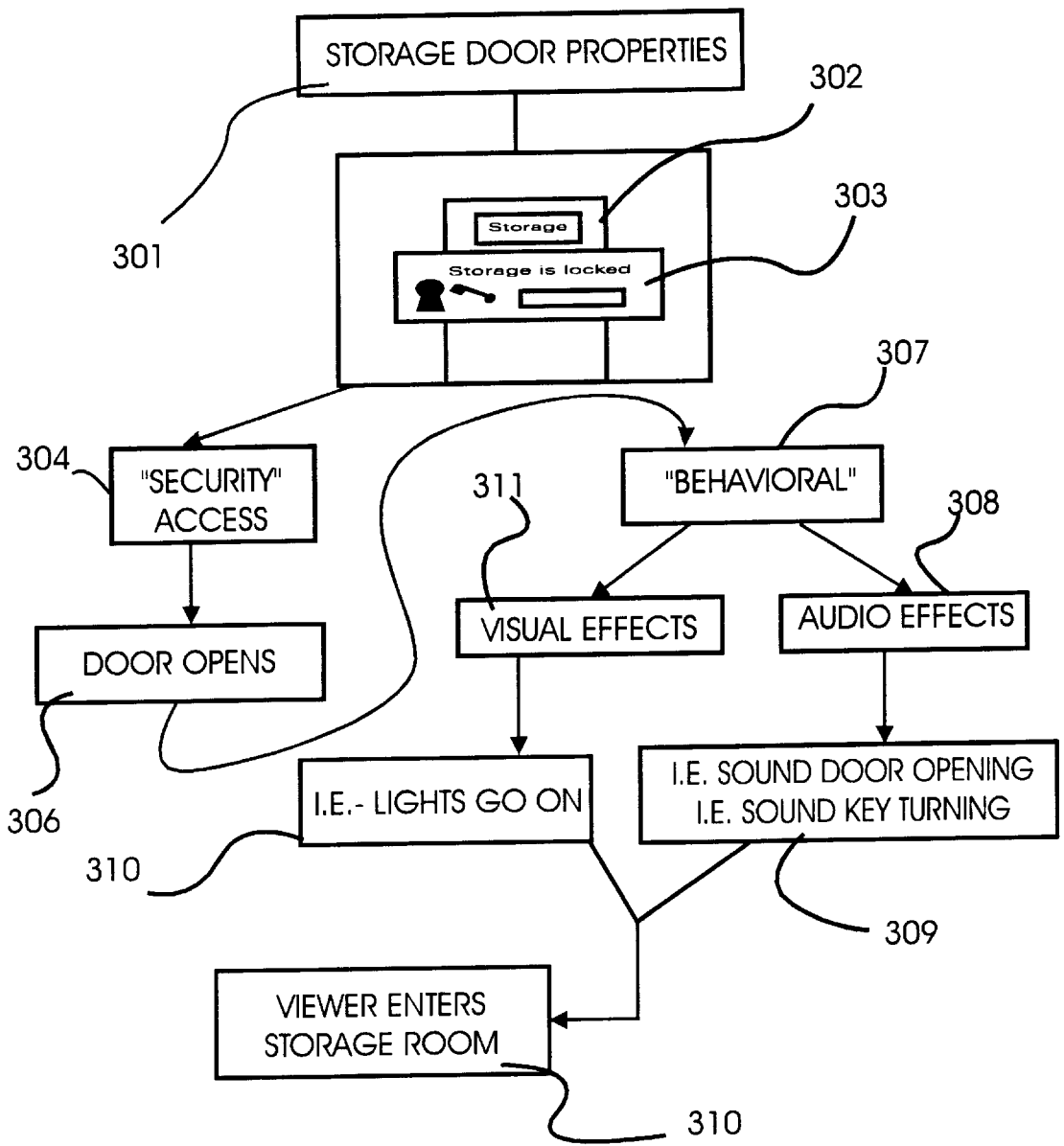
FIG. 5 chart illustrates the security and behavioral properties of an access door (threshold) to control both security and behavioral effects (i.e. audio and visual) as one navigates through a 3-d virtual workspace environment threshold.

FIG. 5 is a representation of how the Storage Door threshold 301 can be used to exercise control over both the security 304 and behavioral 307 properties of the customizable protocol for entry and exit of places in 3-D virtual environments. The storage door 302, calls for the user to enter at the appropriate spot, a security password 303. The correct password initiates two types of properties at the threshold. The door opens 306 completing the security control which initiates one or more of a plurality of possible behavioral effects such as visual 311 such as turning on the lights in the storage room or audio effects 308, such as providing the sound of a key turning in a lock, the squeaking sound of a door opening 309 and the visual effect of the user being moved through the passageway entering the storage room 310.

Figure 6:
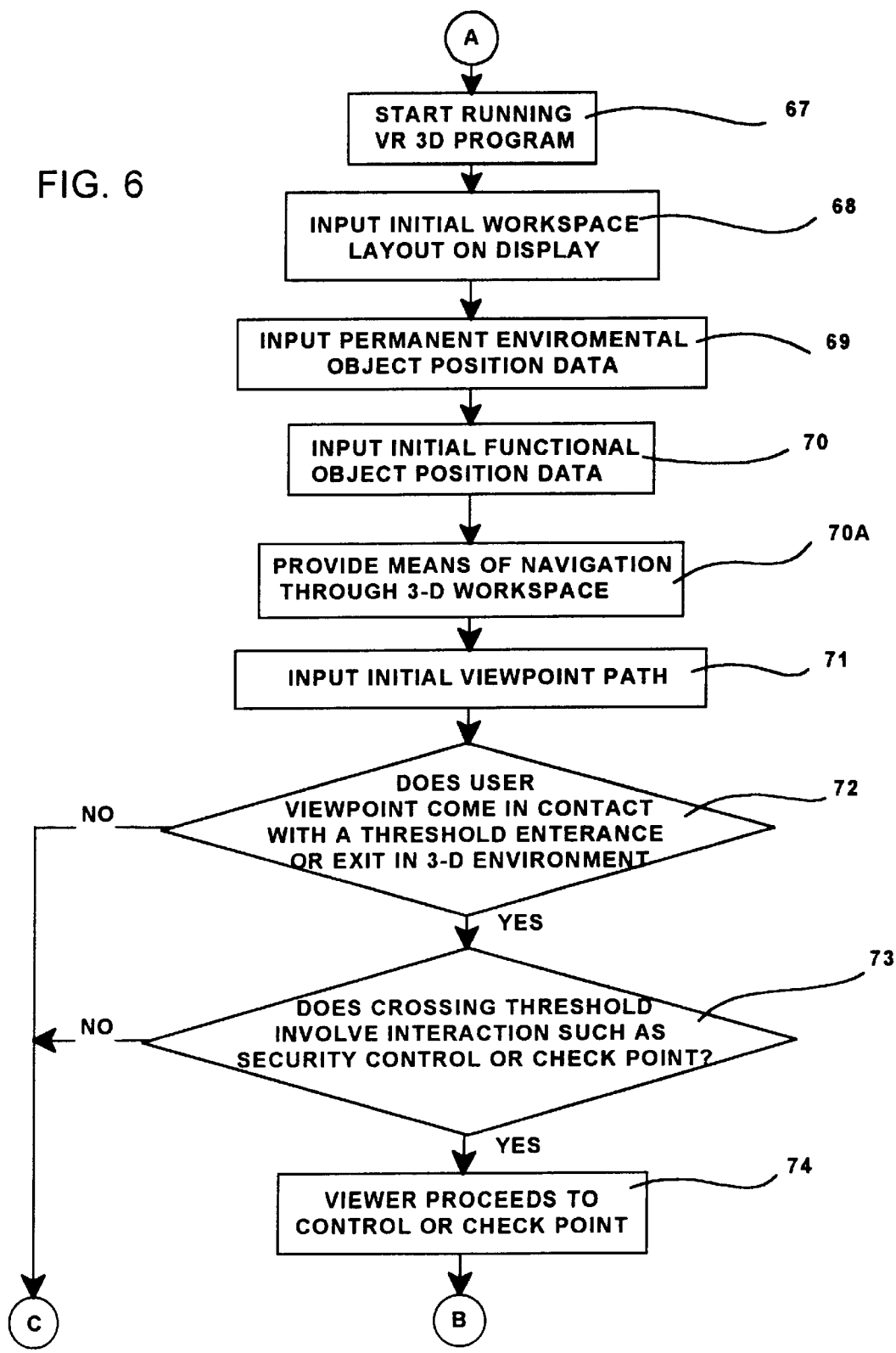

In FIG. 6, the virtual reality three-dimensional workspace, is created and stored as well as virtual reality 3D objects. These would include the object oriented code representation of such objects as the door in FIG. 2 at 101, or the objects in FIG. 4. In the process we input permanent environmental object positions and several user interactive computer programs are stored in the system of FIG. 1. These would be stored in suitable storage means accessible to RAM 14 of FIG. 1 wherein the application programs would be loaded when activated. Then, two-dimensional interactive interface is stored associated with the three-dimensional object which represents it or is a proxy for it. In this connection, it should be noted that with the recent advance of object oriented programming techniques, such as those described above and including such object oriented techniques as OpenGL or the above-described VRT, it is possible to create software capsules or entities which not only define the object itself but associated the object with an interactive planar two-dimensional image interface. In this manner, the two-dimensional interactive planar image interface is permanently associated with the particular three-dimensional object. Thus, even if the position of the object is subsequently changed in the workspace or the size of object is changed during navigation, the two-dimensional interactive image will remain permanently associated with the object.

Regarding the specifics of process in FIG. 6, we now proceeds to point A in FIG. 6 where the created virtual reality workspace program is run, step 67. As previously mentioned, the program is run on a system such as that shown in FIG. 1 with the particular application program 40 herein being loaded on RAM 14 and connected to display adapter 36 which forms the stored images via frame buffer 39 controlling display monitor 38.

The program in FIG. 6 initially sets up the workspace layout on the display as well as the object layout and the positions of the objects in the workspace, step 68. This is then followed by 69, input position data on environmental objects and similarly for the functional objects 70. This then followed by 70a, where the means of navigation thorough 3-D workspace is provided and then followed by the input of the initial viewpoint path 71.

At this point we will proceed to the first decision block 72, and which asks whether the user's viewpoint has as come in contact with a threshold entrance or exist in 3-D environment. If the answer is no, then the process proceeds to the end at FIG. 7 at 76 and 86 respectively. If the answer to query 72 is yes then we proceed to query 73 FIG. 6 which asks whether crossing the threshold involves some interaction with a security control check point. If the answer is no, then the process proceeds to the end 86 FIG. 7 via point 76. If the answer to query 73 is yes then the process proceeds to control point 74. The viewer then supplies the security code number at 75 and the process then asks whether visual effects are to be activated. If yes then the visual effects are activated 78 FIG. 7 and the process proceeds to 84 and the visual effects such as lights going on accompany the passage through the threshold to the end at 86. If the answer to query 77 is no, then the next question at 78 is whether audio effects are to be activated as the viewer passes through the threshold. If the answer to 79 is no then the viewer moves through the threshold into the new 3-D environment with no accompanying audio or visual effects 82 and proceeds to the end at 86. If the answer to query 79 is yes, then audio effects will take place at 80 and the query at 81 then asks whether both audio and visual effects should take place or only audio. If the answer to 81 is no, then the process proceeds to 83 where only audio will accompany the passage through the threshold and proceeds to the end at 86. However if the answer to 81 is yes, that the passage should be accompanied by both audio and visual effects, then the process proceeds to 85, both effects take place and to the end at 86.

Although certain preferred embodiments have been shown and described, it will be understood that many changes and modifications may be made therein without departing from the scope and intent of the appended claims.

We claim:

1. A data processor controlled display system for displaying a virtual three-dimensional workplace comprising:

means for defining a plurality of three dimensional regions in said workplace;

means for displaying a plurality of three-dimensional objects within said regions;

viewer interactive means for navigating within said workspace;

region passage means separating said plurality of regions comprising:

means for displaying passages between adjacent regions in said plurality of regions;

means for defining a set of at least one condition which must be met in order to permit said viewer interactive means to move the viewer from one of said regions to another through a selected passage means.

2. The data processor controlled display system of claim 1 wherein each of said plurality of region passage means is defined by data storage in said system as a software entity.

3. The data processor controlled display system of claim 2 wherein said software entities are object oriented programming entities including data defining the displayed passage and data defining the conditions which must be met in order to permit passage through said displayed passage.

4. The data processor controlled display system of claim 1 wherein a security checks, represents said means for defining a set of condition which must be met in order to permit said navigating means to move said viewer from one of said regions to another of said regions, through said selected passage means.

5. The data processor controlled display system of claim 4 wherein said security checks are a list of authorized users or a password.

6. The data processor controlled display system of claim 1 wherein visual or audio effects, represent said means for defining a set of condition which must be met in order to permit said navigating means to move the viewer from one of said regions to another of said regions, through said selected passage means.

7. The data processor controlled display system of claim 6 wherein said visual effects are to, fade, cut, or to wipe.

8. A data processor controlled display method for displaying a virtual three-dimensional workplace comprising:

defining a plurality of three dimensional regions in said workplace;

displaying a plurality of three-dimensional objects within said regions;

providing a viewer with interactive means for navigating within said workspace;

providing region passage means through said separate plurality of regions by:
displaying passages between adjacent regions in said plurality of regions;
defining a set of at least one condition which must be met in order to permit said viewer interactive means to move the viewer from one of said regions to another of said regions, through a selected passage means.

9. A data processor controlled display method for displaying a virtual three-dimensional workplace of claim 8, wherein each of said plurality of said region passage means is defined by data stored in said system as a software entity.

10. A data processor controlled display method for displaying a virtual three-dimensional workplace of claim 8, wherein said software entities are object-oriented programming entities including data defining the displayed passage and data defining the conditions which must be met in order to permit passage through said displayed passage.

11. A data processor controlled display method for displaying a virtual three-dimensional workplace of claim 8, wherein security checks, represent said means for defining a set of condition which must be met in order to permit said navigating means to move the viewer from one of said regions to another through said selected passage means.

12. The data processor controlled display method of claim 11 wherein said security checks are a list of authorized users or a password.

13. The data processor controlled display method of claim 8, wherein said visual or audio effects, represent said means for defining a set of condition which must be met in order to permit said navigating means to move the viewer from one of said regions to another through said selected passage means.

14. The data processor controlled display method of claim 13 wherein said visual effects are to, fade, cut, or to wipe.

15. A computer readable program having data structures included on a computer readable medium which causes the display on a data processor controlled display of a virtual three-dimensional workspace comprising:

means for defining a plurality of three dimensional regions in said workplace;

means for displaying a plurality of three-dimensional objects within said regions;

viewer interactive means for navigating within said workspace;

region passage means separating said plurality of regions comprising:
means for displaying passages between adjacent regions in said plurality of regions;
means for defining a set of at least one condition which must be met in order to permit said viewer interactive means to move the viewer from one of said regions to another of said regions through a selected passage means.

16. The computer program of claim 15 wherein each of said plurality of region passage means is defined by data storage in said system as a software entity.

17. The computer program of claim 15 wherein said software entities are object-oriented programming entities including data defining the displayed passage and data defining the conditions which must be met in order to permit passage through said displayed passage.

18. The computer program of claim 15 wherein a security checks, represents said means for defining a set of condition which must be met in order to permit said navigating means to move the viewer from one of said regions to another of said regions through said selected passage means.

19. The computer program of claim 18 wherein said security checks are a list of authorized users or a password.

20. The computer program of claim 15 wherein visual or audio effects, represent said means for defining a set of condition which must be met in order to permit said navigating means to move the viewer from one of said regions to another through said selected passage means.

21. The computer program of claim 20 wherein said visual effects are to, fade, cut, or to wipe.

* * * * *

UNITED STATES PATENT AND TRADEMARK OFFICE
CERTIFICATE OF CORRECTION

| | | |
|---|---|---|
| PATENT NO. | : 6,069,632 | Page 1 of 1 |
| APPLICATION NO. | : 08/887829 | |
| DATED | : May 30, 2000 | |
| INVENTOR(S) | : Mullaly et al. | |

It is certified that error appears in the above-identified patent and that said Letters Patent is hereby corrected as shown below:

Column 11, line 48, claim 10, delete "8" and insert --9--

Signed and Sealed this
Twenty-eighth Day of February, 2012

David J. Kappos
*Director of the United States Patent and Trademark Office*